United States Patent
Minardi

[11] Patent Number: 5,286,204
[45] Date of Patent: Feb. 15, 1994

[54] TACTILE SYMBOLS FOR COLOR RECOGNITION

[75] Inventor: Michael J. Minardi, Tampa, Fla.

[73] Assignee: Touch Books, Inc., Tampa, Fla.

[21] Appl. No.: 879,526

[22] Filed: May 4, 1992

Related U.S. Application Data

[63] Continuation of Ser. No. 754,323, Sep. 4, 1991, abandoned, which is a continuation of Ser. No. 630,343, Dec. 17, 1990, abandoned, which is a continuation of Ser. No. 414,142, Sep. 28, 1989, abandoned.

[51] Int. Cl.[5] .............................................. G09B 21/00
[52] U.S. Cl. .................................................... 434/113
[58] Field of Search .................. 434/112, 113, 114, 98

[56] References Cited

U.S. PATENT DOCUMENTS

| | | | |
|---|---|---|---|
| 3,363,339 | 1/1968 | Place | 434/113 |
| 3,949,488 | 4/1976 | Welch | 434/98 |
| 4,404,764 | 9/1983 | Wills et al. | 434/113 X |
| 4,650,421 | 3/1987 | Anczurowski | 434/113 |
| 4,737,108 | 4/1988 | Chepaitis | 434/113 |

FOREIGN PATENT DOCUMENTS

| | | | |
|---|---|---|---|
| 172434 | 6/1906 | Fed. Rep. of Germany | 434/98 |
| 0089369 | 5/1984 | Japan | 434/113 |
| 1146527 | 3/1969 | United Kingdom | 434/112 |
| 2011145 | 12/1977 | United Kingdom | 434/113 |

OTHER PUBLICATIONS

*Teaching Resources*; 1979 catalog; pp. 79-80; Sep. 29, 1978.
"Introductory Notes on the Braille System of Reading and Writing for the Blind"; A. Lipton; Apr. 15, 1959.

Primary Examiner—Richard J. Apley
Assistant Examiner—Karen A. Jalbert
Attorney, Agent, or Firm—Foley & Lardner

[57] ABSTRACT

Tactile symbols for color recognition by blind or visually impaired persons comprising a surface above which a color symbol is raised substantially parallel to the first surface. The raised surface of the unitary symbol is continuous such that persons may identify the symbol by touch.

28 Claims, 1 Drawing Sheet

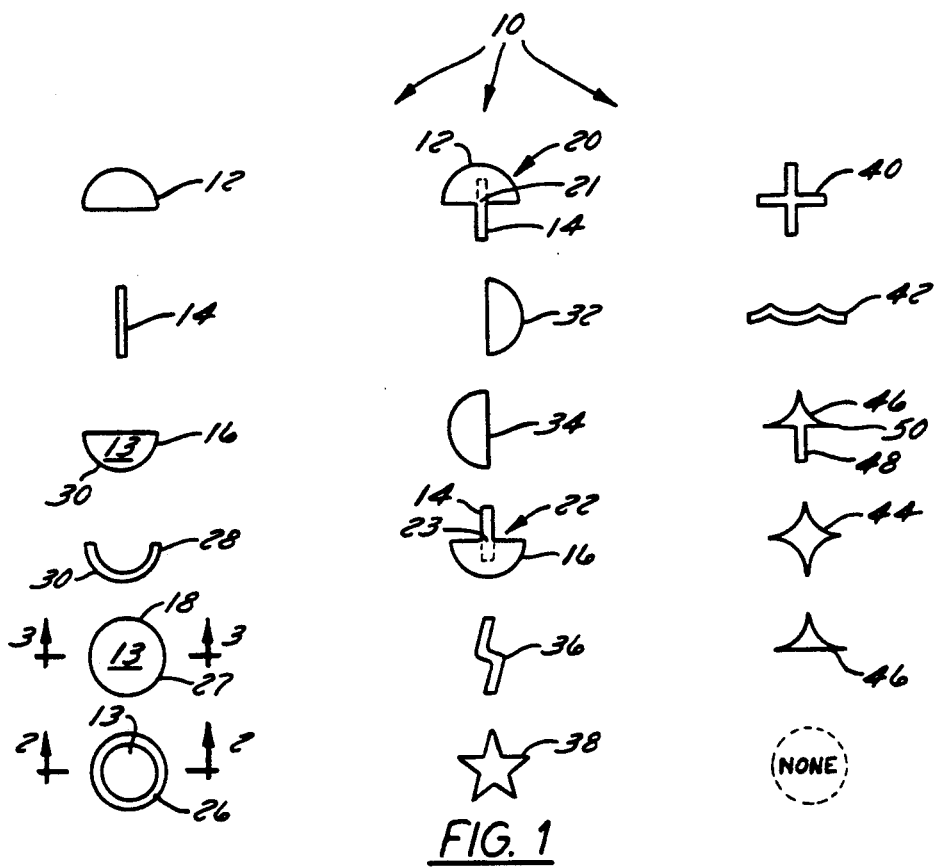
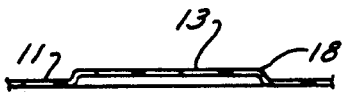
FIG. 3
FIG. 2
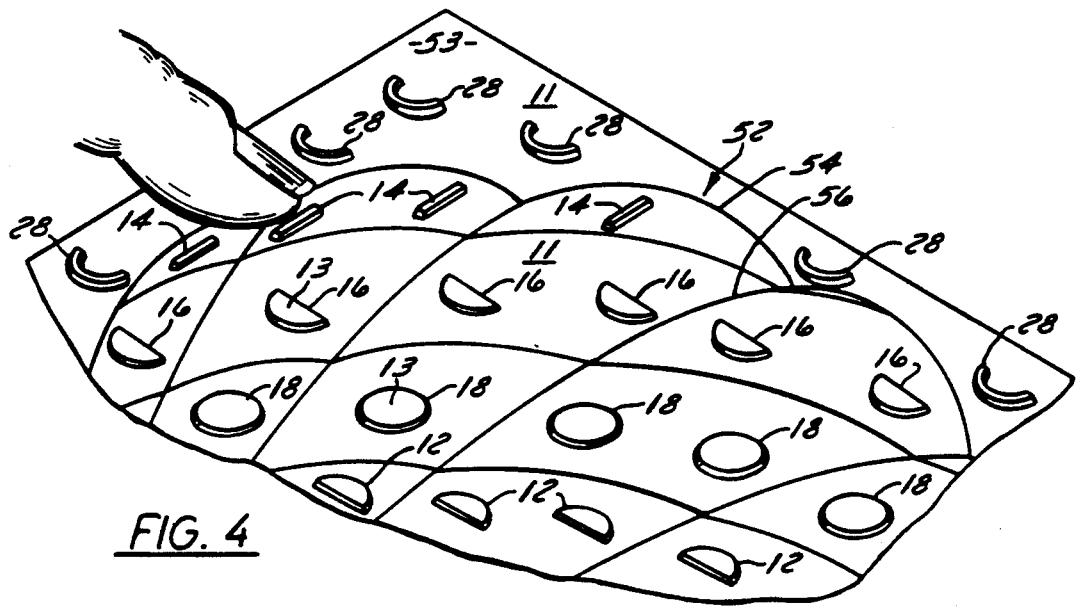
FIG. 4

TACTILE SYMBOLS FOR COLOR RECOGNITION

CROSS-REFERENCE TO RELATED APPLICATIONS

This application is a continuation application from U.S. Ser. No. 07/754,323, filed Sep. 4, 1991, now abandoned, entitled "Tactile Symbols For Color Recognition", which in turn is a continuation application from U.S. Ser. No. 07/630,343, filed Dec. 17, 1990, now abandoned, itself a continuation application from U.S. Ser. No. 07/414,142, filed Sep. 8, 1989, now abandoned.

BACKGROUND OF THE INVENTION

1. Field of the Invention

The present invention relates to the field of tactile symbols that can be recognized by the blind or the visually impaired by tracing with their fingertips, and is directed particularly to symbols for identifying color.

2. Description of the Prior Art

The use of a series of raised dots impressed in paper or other media to form symbols for the individual letters of the Roman alphabet and the conventional arabic numerals has been in existence as the Braille system since the early 19th Century. Each single letter, or numeral, is represented in a matrix of six dots, three dots high by two dots wide which is defined as a cell. Extra codes are often necessary to identify capitals or the fact that the cell following is actually a number instead of a letter as the numerals 1 through 9 plus 0 use the same code as the letters A through J.

Many modifications to the Braille system and alternative systems have been patented in attempts to improve the Braille system. For example, U.S. Pat. No. 3,363,339 to Place discloses a newly defined Braille cell structure, and U.S. Pat. No. 3,197,889 to Micropoulou discloses an alternative tactile code utilizing a four projection cell to identify the thirteen most used consonants; however, the remaining thirteen letters require a second box of four projections. U.S. Pat. No. 3,718,991 to Kafafian discloses a new cell arrangement which utilizes a reference symbol to aid the reader in maintaining his place and orientation as he reads the symbols.

These aforementioned patents, however, do not provide any tactile symbols for the identification of color other than, of course, the use of the appropriate letter symbols to spell out the word signifying a color.

A patent to Wills, et al., U.S. Pat. No. 4,404,764, discloses the use of Braille on picture cards which identify in word form the depictions on the card. For example, if a sail boat were pictured, the Braille symbols for sail boat would be raised on the card at the location of the pictured sail boat. This patent does not claim or disclose the use of symbols for color other than the Braille letters spelling a color.

U.S. Pat. No. 4,650,421, issued to Anczurowski discloses the use of crosshatching, which may be either raised using the xerographic process or embossed on a substrate, to identify color. A first color may be represented by a series of horizontal lines, a second color will be a series of parallel lines angled at 60° and 120° with the lines of the first primary color. A third primary color will be represented by a third series of parallel lines oriented so that it maintains a 60° or 120° angle with both the first and the second series of lines. Combining the symbols for two or more of the colors would present a symbol comprising crosshatched lines to represent a new color, the new color formed by mixing the colors represented by the symbols together.

U.S. Pat. No. 4,737,108 to Chepaitis disclose a tactile code for the alphabet and for numerals. The embossed symbols utilize raised circular and square frames surrounding additional raised areas which depict a physical association with the letters or numbers they represent. The patent does not claim or disclose symbols for colors and may represent colors only by spelling the appropriate word.

Color is widely used within our language as a means of communicating not only the colors of objects but as coding on maps, charts and other visual displays. Color is an important aspect in communicating to and with the blind or visually impaired. There is a need for simple unitary symbols which may be applied on everything from maps to clothing. There is also a need for such symbols that may be embossed on photographs to provide shape, form and color to the pictured elements. A crosshatching system would dominate such photographs losing the shape and form of the photographic elements.

SUMMARY OF THE INVENTION

The present invention relates to tactile symbols for color recognition. The symbols are small but easily embossed upon photographs and may be interposed with Braille symbols when color is called for. The symbols may be embossed directly upon the surface in which the color identification is required, or the symbols may be separately formed and attached to the appropriate surfaces. The set of three primary color symbols are separate and easily identifiable raised forms representing each of the primary colors. The secondary set of color symbols, also separate and easily identifiable, are composed by combining of the two symbols for the two primary colors which are mixed to provide the secondary color. A third set of symbols for lighter colors, usually created by mixing the color with white, is formed by raising the outline of the symbol representing the color to be lightened. A fourth set of symbols is used to represent colors more complex than the primary or secondary colors.

BRIEF DESCRIPTION OF THE DRAWINGS

For a fuller understanding of the nature and objects of the invention, reference should be made to the following detailed description taken in connection with the accompanying drawings, in which:

FIG. 1 is a plan view of the various symbols used for color identification.

FIG. 2 is a cross section taken along line 2—2 in FIG. 1.

FIG. 3 is a cross section taken along line 3—3 in FIG. 1.

FIG. 4 is an enlarged perspective view illustrating the symbols embossed upon a photograph.

Similar reference characters refer to similar parts throughout the several views of the drawings.

DETAILED DESCRIPTION

A preferred embodiment for this invention of tactile symbols for color recognition is illustrated in FIG. 1, which displays the plan view of the primary color symbols and symbols for the most frequently used colors.

In a preferred embodiment as shown in FIGS. 1–4, the symbols shown generally as 10 are formed into a first surface 11 upon which a color representation is desired.

This surface defines a first plane or base. The symbol creates a second continuous and unitary generally planar surface 13 when it is embossed into the first surface 11. That is, within the peripheral boundaries of each symbol, each raised surface is a single or unitary, continuous planar surface. The embossing or other similar process raises this second surface as a second plane above and substantially parallel to the first plane. The shape of this unitary raised second surface 13 can be detected by blind or visually impaired persons through the sense of touch, permitting them to identify the color which the symbol represents.

It is well known that by mixing the three primary colors red, blue and yellow in different combinations and different proportions all other colors can be formed and, in addition, by mixing any color with black, white, or black and white, different shades, tints, and tones, respectively, can be formed. For example, mixing red with black results in a shade of red called maroon; mixing red with white results in a tint called pink.

The current invention defines a primary set of three symbols representing the three primary colors, red, yellow and blue. The raised symbol of a horizontally oriented upper hemisphere 12 represents the primary color yellow. The raised symbol of a vertically oriented line 14 represents the color red. The raised symbol of a horizontally oriented lower hemisphere 16 represents the color blue.

The current invention defines a secondary set of three symbols representing the three secondary colors, green, orange and purple. This set of color symbols was developed by utilizing the concept that mixing colors together forms new colors; therefore, combining the color symbols will provide the new symbols for the new colors thus formed. It is commonly known that equal proportions of yellow and blue when mixed make the color green; therefore, by combining the horizontally oriented upper hemisphere 12, the symbol for yellow, and the horizontally aligned lower hemisphere 16, the symbol for blue, a new symbol is formed: a raised circle 18 which is the symbol for green. In the same manner, by combining the raised horizontally oriented upper hemisphere 12 the symbol for yellow, with the raised vertically oriented line 14, the symbol for red, a new symbol 20 is formed having a horizontally aligned upper hemisphere 12 combined with a vertically oriented raised line 14 projecting from the hemisphere's center point 21: a new symbol for orange is formed. The final secondary color, purple, is formed by combining the colors red and blue. Therefore, by combining the raised horizontally oriented symbol of a lower hemisphere 16 with the vertically oriented line 14, the symbol 22 for purple is formed: a horizontally aligned lower hemisphere 16 having a vertical line 14 projecting upward from its center point 23.

By mixing colors with white, a lighter tint may be created, for example, pink, light green and light blue. A tertiary set of a plurality of symbols encompasses these light colors. As shown in FIG. 2, the symbols for these lighter colors are formed by raising only the edge of the perimeter of the color symbol. Therefore, the symbol 18 for the color green, a circle with a raised second surface 13, as shown in FIGS. 1 and 3, is modified to form the symbol 26 for the color light green. This modification is accomplished by raising only the edge 27 of symbol 18 to form the raised second surface 13, as shown in FIG. 1 and 2, as the new symbol 26. The color for light blue is formed under the same basic guidelines in that the lower horizontal hemisphere 16, the symbol for the color blue, is used as the basis for forming the color symbol for light blue, the crescent symbol 28. The arcuate portion of edge 30 is the only portion of the hemisphere 16 which remains raised in symbol 28, forming a raised arc.

Symbols for additional colors, or a quartic set of symbols, can be derived in a similar manner or totally new original symbols may be used. A raised right vertical hemisphere 32 represents the color maroon, while a raised left vertical hemisphere 34 represents the color magenta. A stylized "S" 36 is the symbol for silver. A raised five-point star 38 represents the color gold; a raised plus symbol 40 represents tan, and a raised scalloped horizontal line 42 represents the aqua color of water. A raised stylized diamond 44 represents black, while the upper half of the stylized diamond 46 represents gray. A symbol 50 comprised of the upper half of the stylized diamond 46 and a raised vertical line 48 extending downward therefrom represents the color brown. Any area without a color is considered to be white.

Having thus set forth a preferred construction for the tactile symbols for color recognition, it is to be remembered that this is but a preferred embodiment. For example, the unitary symbols may be punched, cut, or by other similar and well known means, removed from a relatively thick material and fastened by adhesives, or other well known fastening means, to the first surface, thus, providing a raised symbol that may be detected and identified by the sense of touch.

Attention is now invited to a description of some of the uses to which these symbols may be applied; however, it must be remembered that many additional uses exist, for example, stitching the symbols onto clothing including socks, neckties, suits, etc.

FIG. 4 discloses the application of the embossed figures to a portion of a photograph of a hot air balloon shown generally as 52 on the first surface 53. The outline 54 of the hot air balloon and the separation lines 56 of the balloon panels are embossed into the photograph to both provide shape and a basis for applying the color symbols 10. More specifically, in FIG. 4 it can be seen that the balloon 52 is set against a blue sky as indicated by the light blue symbols 28 and that the balloon is striped denoted b the red symbols 14, blue symbols 16, green symbols 18 and the yellow symbols 12, which provide a colorful picture within the mind of the visually impaired or blind person who is touch reading the photograph.

Having set forth the description of the use of the tactile symbols, it will thus be seen that the objects set forth above among those made apparent from the preceding description are efficiently attained and, since certain changes may be made in the above article without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Now that the invention has been described,

What is claimed is:

1. A device for symbolically encrypting color information to convey said color information to a blind or visually-impaired individual by touching a symbol uniquely indicative of a predetermined color, comprising a field defined within a surface bearing said color information and a symbol for tactile decryption by said individual wholly contained within said field, wherein said symbol has a peripheral shape uniquely identifying said predetermined color, wherein said symbol is developed from an array of primary geometric shapes corresponding to primary colors and further wherein said peripheral shape indicative of color variations is derived by a geometric addition of said shapes congruous with color addition of said primary colors.

2. The device of claim 1, wherein said geometric addition is two dimensional.

3. The device of claim 2, wherein said symbol is rotationally invariant.

4. The device of claim 3, wherein the geometric shape for red is a vertical bar, the geometric shape for yellow is an upper hemisphere and the geometric shape for blue is a lower hemisphere.

5. The device of claim 4, wherein dark tones of a color are represented by a symbol having a substantially uniform height.

6. The device of claim 5, wherein light tones of a color are represented by a symbol having differing height projections at its periphery and the interior region defined thereby.

7. The device of claim 6, wherein said light tones are represented by a symbol having greater height at said periphery than at said interior.

8. The device of claim 2, wherein said symbol is three dimensional.

9. A still graphic image having on its surface a plurality of regions of differing color, each of said regions containing a device for symbolically encrypting color information pertaining to that region to be tactically decrypted by a blind or visually-impaired individual upon touching said device, each of said devices comprising a symbol having a peripheral shape uniquely corresponding to the color of the region within which it is disposed, wherein said symbol is developed from an array of primary geometric shapes corresponding to primary colors and further wherein said peripheral shape indicative of color variation is derived by a geometric addition of said shapes congruous with color addition of said primary colors.

10. The image of claim 9, wherein said geometric addition is two dimensional.

11. The image of claim 10, wherein at least some of the regions have a three dimensional contour.

12. The image of claim 11, comprising a photograph.

13. The image of claim 12, wherein said symbol is three dimensional.

14. The image of claim 9, wherein said symbol is rotationally invariant.

15. The image of claim 9, wherein the geometric shape for red is a vertical bar, the geometric shape for yellow is an upper hemisphere and the geometric shape for blue is a lower hemisphere.

16. The image of claim 15, wherein dark tones of a color are represented by a symbol having a substantially uniform height.

17. The image of claim 16, wherein light tones of a color are represented by a symbol having differing height projections at its periphery and the interior region defined thereby.

18. The image of claim 17, wherein said light tones are represented by a symbol having greater height at said periphery than at said interior.

19. A method for conveying color information to a blind or visually-impaired person from a surface capable of being touched by said person, comprising the steps of encrypting color information in a symbol having a peripheral shape identifying a predetermined color; and decrypting said information by touching said symbol and identifying said predetermined color, and wherein said symbol is developed from an array of primary geometric shapes corresponding to primary colors and further wherein said peripheral shape indicative of color variation is derived by a geometric addition of said shapes congruous with color addition of said primary colors.

20. The method of claim 14, wherein said geometric addition is two dimensional.

21. The method of claim 20, wherein said symbol is rotationally invariant.

22. The method of claim 14, wherein the geometric shape for red is a vertical bar, the geometric shape for yellow is an upper hemisphere and the geometric shape for blue is a lower hemisphere.

23. The method of claim 22, wherein dark tones of a color are represented by a symbol having a substantially uniform height.

24. The method of claim 23, wherein light tones of a color are represented by a symbol having differing height projections at its periphery and the interior region defined thereby.

25. The method of claim 24, wherein said light tones are represented by a symbol having greater height at said peripheral than at said interior.

26. A method for conveying color information to a blind or visually-impaired person from a surface capable of being touched by said person, comprising the steps of encrypting color information in a symbol having a peripheral shape identifying a predetermined color; and decrypting said information by touching said symbol and identifying said predetermined color, and wherein said peripheral shape of said symbol is capable of indicating a correct orientation of said surface.

27. A system of color recognition by blind or visually impaired persons comprising:
a plurality of tactile symbols protruding from a surface, each of said symbols having a shape identifying a color;
wherein at last one of said symbols has a shape with no more than one axis of symmetry, which shape is rotationally distinct from the shapes of the other symbols, whereby the orientation of the surface and the other symbols may be ascertained by feeling said at least one symbol, and wherein the plurality of unitary tactile symbols comprises:
a first subset of symbols which represent primary colors;
a second subset of symbols derived by combining one of the symbols of the first subset with another of the symbols of the first subset, wherein the shape of each symbol of said second subset identifies the color created by combining the colors identified by the symbols of the first subset from which each symbol of the second subset is derived.

28. A system of color recognition by blind or visually impaired persons comprising a plurality of tactile symbols protruding from a surface, each of said symbols having a shape identifying a color, wherein said plurality of tactile symbols comprises:
- a first subset of symbols which represent primary colors;
- a second subset of symbols derived by combining one of the symbols of the first subset with another of the symbols of the first subset, wherein the shape of each symbol of said second subset identifies the color created by combining the colors identified by the symbols of the first subset from which each symbol of the second subset is derived.

* * * * *